(12) United States Patent
Carter

(10) Patent No.: US 10,147,303 B1
(45) Date of Patent: Dec. 4, 2018

(54) ADJUSTING ALARM SETTINGS BASED ON CONTEXT

(71) Applicant: LENOVO (Singapore) PTE. LTD., New Tech Park (SG)

(72) Inventor: Daniel Robert Carter, Fort Wayne, IN (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 15/680,464

(22) Filed: Aug. 18, 2017

(51) Int. Cl.
 *G08B 25/00* (2006.01)

(52) U.S. Cl.
 CPC .................. *G08B 25/001* (2013.01)

(58) Field of Classification Search
 CPC .................................... G08B 25/001
 USPC ......................................... 340/506
 See application file for complete search history.

(56) References Cited

U.S. PATENT DOCUMENTS

| | | | | |
|---|---|---|---|---|
| 8,339,259 B1* | 12/2012 | Biere | ...................... | G06Q 10/10 340/309.16 |
| 9,858,790 B1* | 1/2018 | Goyal | ................ | G08B 21/0423 |
| 2008/0102786 A1* | 5/2008 | Griffin | .................... | H04L 12/66 455/404.2 |
| 2012/0300598 A1* | 11/2012 | Murray | .................. | G04G 13/02 368/251 |
| 2014/0074535 A1* | 3/2014 | Woo-Kwan-Chung | ...................... | G06Q 10/1095 705/7.19 |
| 2014/0269223 A1* | 9/2014 | Mokhnatkina | ......... | G04G 13/02 368/73 |
| 2015/0381800 A1* | 12/2015 | Lee | ......................... | H04W 4/12 455/550.1 |
| 2016/0022202 A1* | 1/2016 | Peterson | .............. | A61B 5/4812 368/251 |
| 2016/0165038 A1* | 6/2016 | Lim | .................. | H04M 1/72533 715/728 |
| 2017/0221342 A1* | 8/2017 | Carr | ....................... | G08B 21/22 |
| 2018/0025616 A1* | 1/2018 | Lin | ...................... | G08B 29/185 |

* cited by examiner

*Primary Examiner* — Hirdepal Singh
(74) *Attorney, Agent, or Firm* — Kunzler, PC

(57) ABSTRACT

Apparatuses, methods, systems, and program products are disclosed for adjusting alarm settings based on context. A method includes determining, by a processor, one or more settings for an alarm. The method includes determining context data associated with an alarm that may affect one or more settings for the alarm. The method includes adjusting one or more settings for an alarm based on context data prior to the alarm being triggered.

16 Claims, 5 Drawing Sheets

ADJUSTING ALARM SETTINGS BASED ON CONTEXT

FIELD

The subject matter disclosed herein relates to alarms and more particularly relates to adjusting alarm settings based on context.

BACKGROUND

Digital alarms are often included as a feature on various devices such as smart phones, watches, tablet computers, clocks, and/or the like. Alarm settings, such as the time that the alarm is set to go off, the volume of the alarm, the type of alarm sound, and/or the like, may be set by a user. However, if the user's schedule changes, or events related to an alarm change, the user may forget to disable the alarm or change the alarm's settings.

BRIEF SUMMARY

An apparatus for adjusting alarm settings based on context is disclosed. The apparatus, in one embodiment, includes a processor and a memory that stores code executable by the processor. In one embodiment, the memory stores code executable by the processor to determine one or more settings for an alarm. In a further embodiment, the memory stores code executable by the processor to determine context data associated with the alarm. The context data may affect the one or more settings for the alarm. In certain embodiments, the memory stores code executable by the processor to adjust the one or more settings for the alarm based on the context data prior to the alarm being triggered.

A method for adjusting alarm settings based on context, in one embodiment, includes determining, by a processor, one or more settings for an alarm. The method, in a further embodiment, includes determining context data associated with the alarm. The context data may affect the one or more settings for the alarm. The method, in certain embodiments, includes adjusting the one or more settings for the alarm based on the context data prior to the alarm being triggered.

A program product for adjusting alarm settings based on context, in one embodiment, includes a computer readable storage medium that stores code executable by a processor. In some embodiments, the executable code includes code to perform determining one or more settings for an alarm. The executable code, in certain embodiments, includes code to perform determining context data associated with the alarm. The context data may affect the one or more settings for the alarm. The executable code, in certain embodiments, includes code to perform adjusting the one or more settings for the alarm based on the context data prior to the alarm being triggered.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
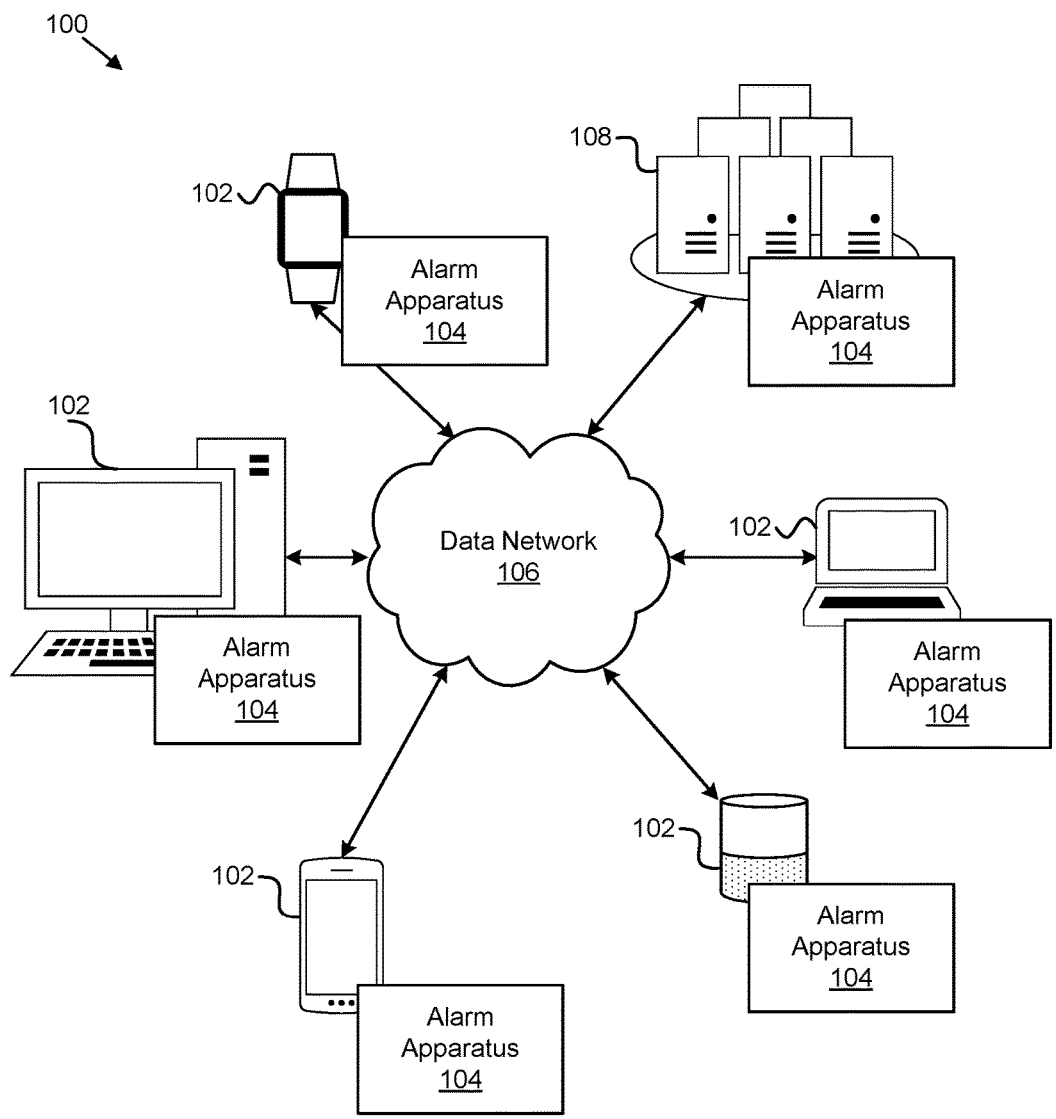
FIG. 1 is a schematic block diagram illustrating one embodiment of a system for adjusting alarm settings based on context.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus for adjusting alarm settings based on context is disclosed. The apparatus, in one embodiment, includes a processor and a memory that stores code executable by the processor. In one embodiment, the memory stores code executable by the processor to determine one or more settings for an alarm. In a further embodiment, the memory stores code executable by the processor to determine context data associated with the alarm. The context data may affect the one or more settings for the alarm. In certain embodiments, the memory stores code executable by the processor to adjust the one or more settings for the alarm based on the context data prior to the alarm being triggered.

In one embodiment, the context data includes location data for a device associated with the alarm. In certain embodiments, the location data includes information that may affect the one or more settings for the alarm. In further embodiments, the memory stores code executable by the processor to adjust the one or more alarm settings by disabling the alarm in response to the location data indicating that the device is at a location that is different than one or more of a location where the alarm was previously created and a location where the alarm was previously disabled.

In one embodiment, the memory stores code executable by the processor to disable the alarm in response to further determining that there are no calendar events scheduled within a time period when the alarm is scheduled to trigger. In certain embodiments, the context data includes message data received at a device associated with the alarm. The message data may be parsed to determine factors that may affect the one or more alarm settings.

In various embodiments, the memory stores code executable by the processor to adjust the one or more alarm settings by delaying the scheduled alarm time in response to the message data indicating that a scheduled event associated with the alarm is delayed. In further embodiments, the memory stores code executable by the processor to adjust the one or more alarm settings by disabling the alarm in response to the message data indicating that a scheduled event associated with the alarm is cancelled.

In one embodiment, the context data includes environment data associated with the alarm. The environment data may be selected from the group consisting of weather data and traffic data. In certain embodiments, the memory stores code executable by the processor to adjust the one or more alarm settings by changing the scheduled alarm time to one of earlier and later than the scheduled alarm time based on the environment data.

In certain embodiments, the memory stores code executable by the processor to reset the one or more alarm settings to the original settings in response to the alarm being triggered. In one embodiment, the memory stores code executable by the processor to present a notification that the one or more alarm settings have been changed.

A method for adjusting alarm settings based on context, in one embodiment, includes determining, by a processor, one or more settings for an alarm. The method, in a further embodiment, includes determining context data associated with the alarm. The context data may affect the one or more settings for the alarm. The method, in certain embodiments, includes adjusting the one or more settings for the alarm based on the context data prior to the alarm being triggered.

In one embodiment, the context data includes location data for a device associated with the alarm. The location data may include information that may affect the one or more settings for the alarm. In further embodiments, the method includes adjusting the one or more alarm settings by disabling the alarm in response to the location data indicating that the device is at a location that is different than one or more of a location where the alarm was previously created and a location where the alarm was previously disabled.

In one embodiment, the context data includes message data received at a device associated with the alarm. The message data may be parsed to determine factors that may affect the one or more alarm settings. In further embodiments, the method includes adjusting the one or more alarm settings by delaying the scheduled alarm time in response to the message data indicating that a scheduled event associated with the alarm is delayed, and adjusting the one or more alarm settings by disabling the alarm in response to the message data indicating that a scheduled event associated with the alarm is cancelled.

In one embodiment, the context data comprises environment data associated with the alarm. The environment data may be selected from the group consisting of weather data and traffic data. In various embodiments, the method includes adjusting the one or more alarm settings by changing the scheduled alarm time to one of earlier and later than the scheduled alarm time based on the environment data. In certain embodiments, the method includes resetting the one or more alarm settings to the original settings in response to the alarm being triggered.

A program product for adjusting alarm settings based on context, in one embodiment, includes a computer readable storage medium that stores code executable by a processor. In some embodiments, the executable code includes code to perform determining one or more settings for an alarm. The executable code, in certain embodiments, includes code to perform determining context data associated with the alarm. The context data may affect the one or more settings for the alarm. The executable code, in certain embodiments, includes code to perform adjusting the one or more settings for the alarm based on the context data prior to the alarm being triggered.

FIG. 1 is a schematic block diagram illustrating one embodiment of a system 100 for adjusting alarm settings based on context. In one embodiment, the system 100 includes one or more information handling devices 102, one or more alarm apparatuses 104, one or more data networks 106, and one or more servers 108. In certain embodiments, even though a specific number of information handling devices 102, alarm apparatuses 104, data networks 106, and servers 108 are depicted in FIG. 1, one of skill in the art will recognize, in light of this disclosure, that any number of information handling devices 102, alarm apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like. The information handling devices 102 may include executable code, functions, instructions, operating systems, and/or the like that provide alarm functionality. As used herein, an alarm may be a system, device, application, function, or the like that gives an audible, visual or other form of alarm signal at a set time.

In one embodiment, the alarm apparatus 104 is configured to determine one or more settings for an alarm, determine context data for the alarm that may affect the one or more alarm settings, and adjust the one or more alarm settings based on the context data prior to the alarm being triggered. The alarm apparatus 104, including its various sub-modules, may be located on one or more information handling devices 102 in the system 100, one or more servers 108, one or more network devices, and/or the like. The alarm apparatus 104 is described in more detail below with reference to FIGS. 2 and 3.

In one embodiment, the alarm apparatus 104 provides a solution over conventional alarm systems, devices, and functions by detecting or determining context information, e.g., information that may affect the settings of the alarm, and dynamically adjusting the alarm settings, e.g., by disabling the alarm or delaying the alarm a certain period of time, or the like, based on the context information. In this manner, the alarm apparatus 104 can dynamically disable the alarm, change the set time that the alarm is scheduled to go off, and/or the like based on context information associated with a user's schedule, environment, location, and/or the like.

In various embodiments, the alarm apparatus 104 may be embodied as a hardware appliance that can be installed or deployed on an information handling device 102, on a server 108, or elsewhere on the data network 106. In certain embodiments, the alarm apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the alarm apparatus 104 may include a power interface, a wired and/or wireless network interface, a graphical interface that attaches to a display, and/or a semiconductor integrated circuit device as described below, configured to perform the functions described herein with regard to the alarm apparatus 104.

The alarm apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the alarm apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the alarm apparatus 104.

The semiconductor integrated circuit device or other hardware appliance of the alarm apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the alarm apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The one or more servers 108 may store data associated with an information handling device 102.

Figure 2:
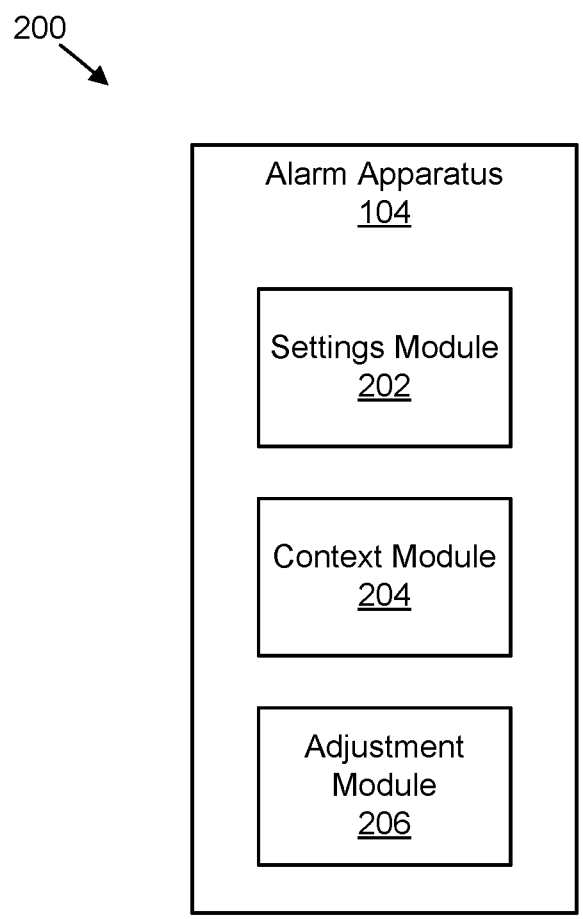
FIG. 2 is a schematic block diagram illustrating one embodiment of an apparatus for adjusting alarm settings based on context.

FIG. 2 is a schematic block diagram illustrating one embodiment of an apparatus 200 for adjusting alarm settings based on context. In one embodiment, the apparatus 200 includes an embodiment of an alarm apparatus 104. The alarm apparatus 104, in some embodiments, includes one or more of a settings module 202, a context module 204, and an adjustment module 206, which are described in more detail below.

In one embodiment, the settings module 202 is configured to determine one or more settings for an alarm. As described above, the alarm may be an alarm or clock application on a smart device, e.g., a phone, watch, tablet, or the like, a device like a clock that has an alarm function, and/or the like. The settings module 202 may check the settings associated with an alarm, such as the day and time that the alarm is set to go off, the type of alarm sound/vibration, the duration of the alarm, and/or the like. For instance, the settings module 202 may determine which alarms are created and/or enabled on a device, and check the metadata, or other settings database or registry, for each alarm to determine the configuration settings for each alarm.

The context module 204, in one embodiment, is configured to determine context data associated with an alarm. As used herein, context data comprises contextual data, information, and/or the like that may affect one or more settings for an alarm. Examples of context data may include event data, calendar data, message data, environment data, location data, and/or the like, as described in more detail below. The context module 204, for instance, may access location data captured by location sensors (e.g., GPS data from one or more GPS sensors); message data from emails, text messages, instant messages, social media messages, and/or the like; calendar and event data from calendars; and/or environment data that may include weather data, traffic data, construction data, and/or the like.

The adjustment module 206, in one embodiment, is configured to adjust one or more settings for an alarm based on the context data. The adjustment module 206 may adjust the one or settings for an alarm prior to the alarm being triggered, e.g., prior to the set time for the alarm to go off. For instance, the adjustment module 206 may access the alarm settings to disable the alarm, change the set time that the alarm is set to go off (e.g., make the time earlier or later), and/or the like, as described below.

In one embodiment, the context data includes location data for a user, a device associated with the user, and/or the like. The location data may be associated with an alarm, and may affect one or more settings of the alarm. In one embodiment, the location data may indicate that the user is at a location that is different than the location where the alarm was set, different than the location where the alarm was previously disabled or turned-off, different than the location where the alarm usually goes off, and/or the like. The context module 204, for instance, may check metadata associated with the alarm that indicates the location where the alarm was created, the locations where the alarm has been disabled or turned off, the locations where the alarm settings are adjusted, and/or the like.

For example, the location data may indicate that the user is on vacation. The user may forget to disable his work alarm that is set to go off every weekday morning at 6:00 am, and may not want to be awakened at this time during his vacation. Thus, the adjustment module 206 may disable the alarm while the user is on vacation based on determining that the location data for the user, e.g., the location of the user's device, is different than location data associated with where the alarm is usually set, disabled, turned off, deactivated, adjusted, and/or the like.

In certain embodiments, before disabling the alarm, the adjustment module 206 may further determine whether the context data indicates that there are no calendar events scheduled within a time period when the alarm is scheduled to go off or trigger. For example, even if the user is at a different location than where the alarm is usually created, turned on, disabled, or the like, the user may be at a business conference or other event where the user needs to be awakened at the same, or about the same, time as when his work alarm is set. In such an embodiment, the adjustment module 206 may leave the alarm settings the same without disabling the alarm. Alternatively, the adjustment module 206 may adjust the time that the alarm is scheduled to go off by changing the set time to be an earlier or later time than was originally set, based on the time of the calendar event.

In one embodiment, the context data may include message data that is received at a device that is associated with the alarm. Message data, as used herein, may include email data, text message data, voice message data, instant message data, social media message data, and/or the like. In certain embodiments, the context module 204 may receive message data from various messaging applications, e.g., applications for email, text, social media, and/or the like, and the adjustment module 206 may parse through the message data to determine factors that may affect the settings for an alarm.

For example, the adjustment module 206 may parse through a text message or social media post that indicates that school has been cancelled due to bad weather. Accordingly, the adjustment module 206 may dynamically disable the user's alarm that is set to wake her up at 6:00 am to get her kids ready for school. In a similar example, the adjustment module 206 may parse a transcription of a voice mail message from a user's kid's school specifying that the start of school will be delayed two hours due to issues with the school buses. Accordingly, the adjustment module 206 may dynamically delay the set time for the user's alarm by two hours to account for the delay in the school bus schedule, thus allowing the user to sleep an additional two hours.

In one embodiment, the context data includes environment data associated with an alarm. As used herein, environment data may include external factors such as weather, traffic, road conditions, construction, natural disasters, and/or other emergencies or unforeseen events that may affect the alarm settings. For instance, the context module 204 may receive traffic data from a traffic application, from a traffic website (e.g., a department of transportation social media feed), and/or the like.

Based on the traffic information, the adjustment module 206 may change the set time that the alarm is scheduled to go off. For example, if traffic is backed up on a route that a user usually takes to work (as determined based on the user's travel history from a mapping application, or the like) due to an accident that is causing a two hour delay, then the adjustment module 206 may adjust the time that the user's work alarm is set to go off from 6:00 am to 4:00 am to account for the traffic jam. Similarly, if there is road construction on the user's route to a job interview that the user was unaware of (which the context module 204 may determine by monitoring a department of transportation's website, Twitter® feed, Facebook® posts, and/or the like), then the adjustment module 206 may adjust the set time for the user's alarm from 6:00 am to 5:00 am to ensure that the user has enough time to get ready to make it to the interview through the road construction.

In one embodiment, the context data may include calendar or event data for a scheduled event. For instance, the context module 204 may monitor a user's calendar application, emails, or the like for event data. If the context module 204 determines that a time and/or day for a scheduled event has changed, and that the change may affect the time that an alarm is set to go off, the adjustment module 206 may dynamically change the alarm settings to account for the change in the scheduled event.

For example, the user may have a meeting scheduled for 9:00 am, and her alarm is set for 7:00 am so that she can get ready and travel to the meeting. However, the meeting organizer may have changed the meeting time to 8:30 am when the user was sleeping so she was unaware of the change. The context module 204 may detect the change in the calendar event for the meeting, and may signal to the adjustment module 206 the details of the change, e.g., that a calendar event start-time has changed from 9:00 am to 8:30 am. The adjustment module 206 may then adjust the alarm that is associated with the calendar event, e.g., the alarm that has a set time closest to the calendar event start time, and adjust the start time for the alarm to 6:30 am instead of 7:00 am.

Figure 3:
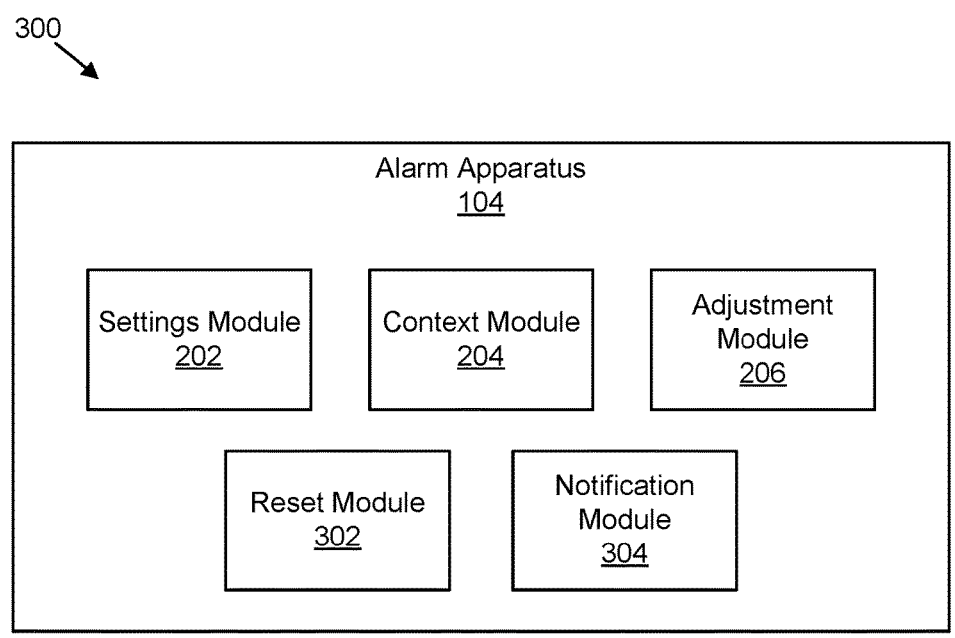
FIG. 3 is a schematic block diagram illustrating one embodiment of another apparatus for adjusting alarm settings based on context.

FIG. 3 is a schematic block diagram illustrating one embodiment of an apparatus 300 for adjusting alarm settings based on context. In one embodiment, the apparatus 300 includes an embodiment of an alarm apparatus 104. The alarm apparatus 104, in some embodiments, includes one or more of a settings module 202, a context module 204, and an adjustment module 206, which may be substantially similar to the settings module 202, the context module 204, and the adjustment module 206 described above with reference to FIG. 2. In a further embodiment, the alarm apparatus 104 includes one or more of a reset module 302, and notification module 304, which are described in more detail below.

In one embodiment, the reset module 302 is configured to reset the one or more alarm settings to the original alarm settings in response to the alarm being triggered, disabled, or otherwise being past the time that is set for triggering the alarm. For instance, the reset module 302 may remember, e.g., store, the alarm settings before the adjustment module 206 changes the alarm settings, and then reset the alarm to the remembered alarm settings after a certain condition is met, e.g., after the alarm goes off, after the alarm is disabled, after the user's location changes, after a scheduled event has occurred, after weather or road conditions have cleared, and/or the like.

For example, the reset module 302 may detect that the user is back home from a vacation, and may re-enable the user's work alarm that the adjustment module 206 disabled while the user was on vacation. In another example, the reset module 302 may reset the user's alarm to the originally set time to be triggered after determining that the condition that triggered the adjustment in the set time, e.g., bad road conditions, a delayed meeting, a traffic jam, and/or the like, has been cleared up.

The notification module 304, in one embodiment, is configured to present a notification that the one or more alarm settings have been changed. The notification may include a text message, an email message, a push notification, and/or the like. The notification may include the reasons for adjusting the alarm settings (e.g., bad traffic, bad travel weather, delayed start time for a scheduled meeting, and/or the like), how the settings were adjusted (e.g., the alarm was disabled, the set time was pushed earlier or later, or the like), and/or the like.

Figure 4:
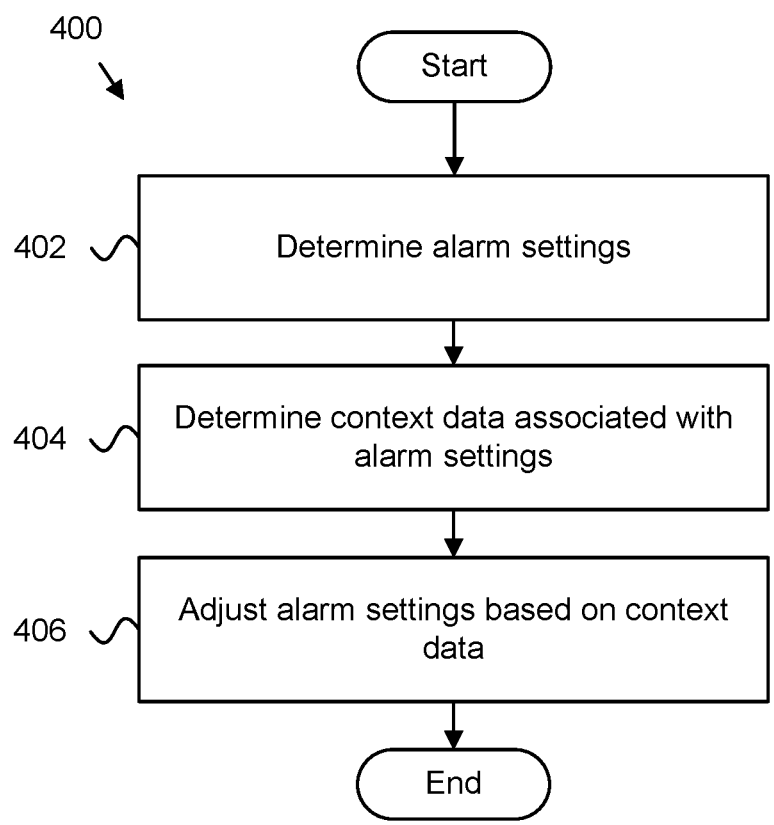
FIG. 4 is a schematic flow chart diagram illustrating one embodiment of a method for adjusting alarm settings based on context.

FIG. 4 is a schematic flow chart diagram illustrating one embodiment of a method 400 for adjusting alarm settings based on context. In one embodiment, the method 400 begins and the settings module 202 determines 402 one or more settings for an alarm. In further embodiments, the context module 204 determines 404 context data associated with an alarm that may affect one or more settings for the alarm. In certain embodiments, the adjustment module 206 adjusts 406 the one or more settings for the alarm based on the context data prior to the alarm being triggered, and the method 400 ends.

Figure 5:
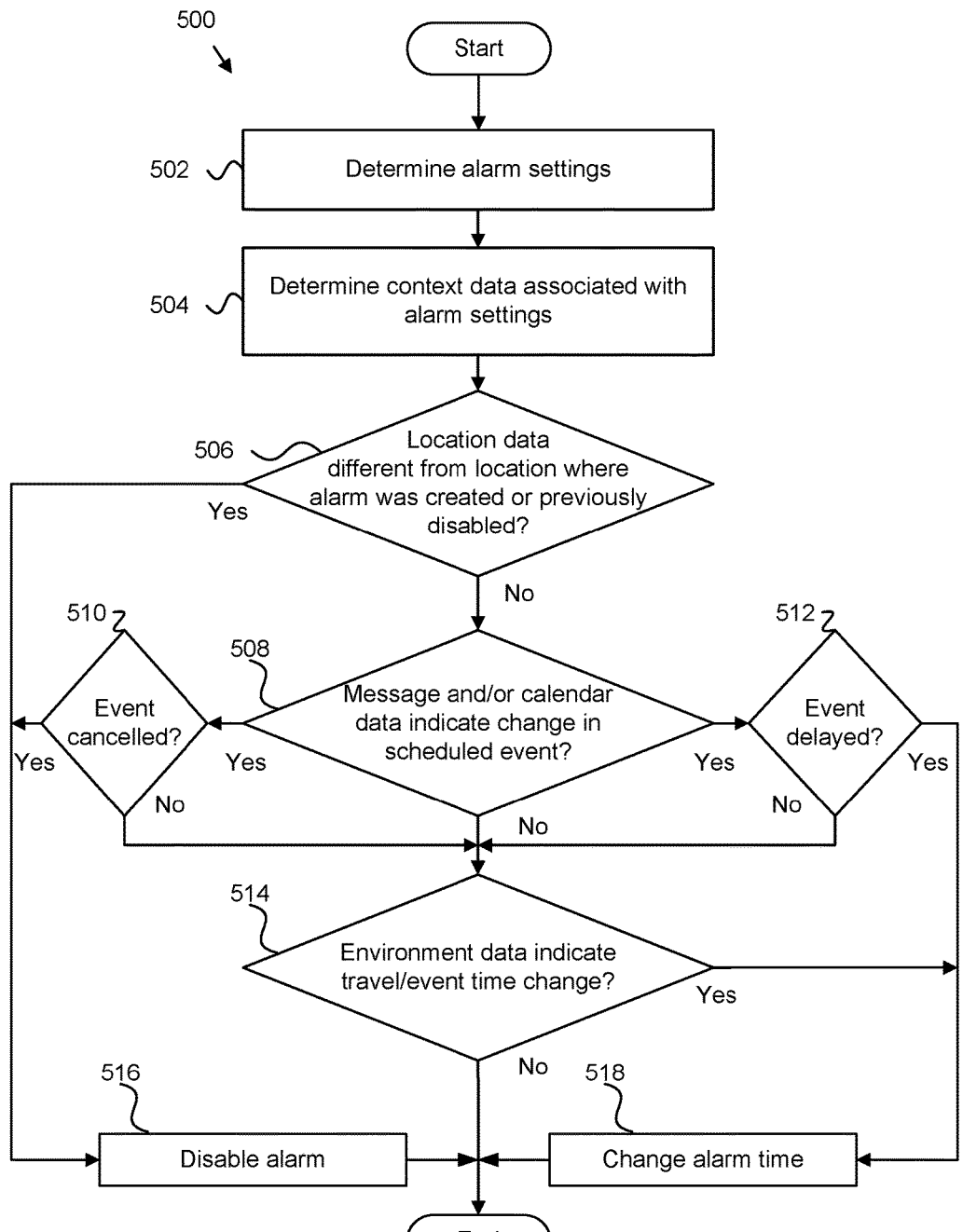
FIG. 5 is a schematic flow chart diagram illustrating one embodiment of another method for adjusting alarm settings based on context.

FIG. 5 is a schematic flow chart diagram illustrating one embodiment of another method 500 for adjusting alarm settings based on context. In one embodiment, the method 500 begins and the settings module 202 determines 502 one or more settings for an alarm. In further embodiments, the context module 204 determines 504 context data associated with an alarm that may affect one or more settings for the alarm.

In one embodiment, the adjustment module 206 determines 506 whether the context data includes location data that indicates that the user is at a different location than where the alarm was previously created or previously disabled, such as the user's home address. If so, then the adjustment module 206 disables 516 the alarm, and the method 500 ends. Otherwise, the adjustment module 206 determines 508 whether the context data includes message data and/or calendar data that indicates a change in a scheduled event, such as a time change for the event.

If so, the adjustment module 206 determines 510 whether the event was cancelled or determines 512 whether the event was delayed. If the adjustment module 206 determines 510 that the event was cancelled, then the adjustment module 206 disables 516 the alarm, and the method 500 ends. If the adjustment module 206 determines 512 that the event was delayed, then the adjustment module 206 changes 518 the set time for the alarm, and the method 500 ends.

Otherwise, the adjustment module 206 determines 514 whether the context data includes environment data that indicates a travel time or event time change. For instance, a traffic jam may delay the user's normal route to work, or bad weather may cause a meeting to be delayed in order to allow people who are travelling through bad weather to arrive on time at the meeting. If the adjustment module 206 determines 514 that the environment data indicates a travel time or event time change, then the adjustment module 206 changes 518 the set time for the alarm, and the method 500 ends.

Embodiments may be practiced in other specific forms. The described embodiments are to be considered in all respects only as illustrative and not restrictive. The scope of the subject matter disclosed herein is, therefore, indicated by the appended claims rather than by the foregoing description. All changes which come within the meaning and range of equivalency of the claims are to be embraced within their scope.

What is claimed is:

1. An apparatus comprising:
    a processor;
    a memory that stores code executable by the processor to:
        determine one or more settings for an alarm;
        determine context data associated with the alarm, the context data affecting the one or more settings for the alarm, the context data comprising location data for a device associated with the alarm, the location data comprising information that may affect the one or more settings for the alarm; and
        adjust the one or more settings for the alarm based on the context data prior to the alarm being triggered by disabling the alarm in response to the location data indicating that the device is at a location that is different than one or more of a location where the alarm was previously created and a location where the alarm was previously disabled.

2. The apparatus of claim 1, further comprising code executable by the processor to disable the alarm in response to further determining that there are no calendar events scheduled within a time period when the alarm is scheduled to trigger.

3. The apparatus of claim 1, wherein the context data comprises message data received at a device associated with the alarm, the message data being parsed to determine factors that may affect the one or more alarm settings.

4. The apparatus of claim 3, further comprising code executable by the processor to adjust the one or more alarm settings by delaying the scheduled alarm time in response to the message data indicating that a scheduled event associated with the alarm is delayed.

5. The apparatus of claim 3, further comprising code executable by the processor to adjust the one or more alarm settings by disabling the alarm in response to the message data indicating that a scheduled event associated with the alarm is cancelled.

6. The apparatus of claim 1, wherein the context data comprises environment data associated with the alarm, the environment data selected from the group consisting of weather data and traffic data.

7. The apparatus of claim 6, further comprising code executable by the processor to adjust the one or more alarm settings by changing the scheduled alarm time to one of earlier and later than the scheduled alarm time based on the environment data.

8. The apparatus of claim 1, further comprising code executable by the processor to reset the one or more alarm settings to the original settings in response to the alarm being triggered.

9. The apparatus of claim 1, further comprising code executable by the processor to present a notification that the one or more alarm settings have been changed.

10. A method comprising:
    determining, by a processor, one or more settings for an alarm;
    determining context data associated with the alarm, the context data affecting the one or more settings for the alarm, the context data comprising location data for a device associated with the alarm, the location data comprising information that may affect the one or more settings for the alarm; and
    adjusting the one or more settings for the alarm based on the context data prior to the alarm being triggered by disabling the alarm in response to the location data indicating that the device is at a location that is different than one or more of a location where the alarm was previously created and a location where the alarm was previously disabled.

11. The method of claim 10, wherein the context data comprises message data received at a device associated with the alarm, the message data being parsed to determine factors that may affect the one or more alarm settings.

12. The method of claim 11, further comprising one of:
    adjusting the one or more alarm settings by delaying the scheduled alarm time in response to the message data indicating that a scheduled event associated with the alarm is delayed; and
    adjusting the one or more alarm settings by disabling the alarm in response to the message data indicating that a scheduled event associated with the alarm is cancelled.

13. The method of claim 10, wherein the context data comprises environment data associated with the alarm, the environment data selected from the group consisting of weather data and traffic data.

14. The method of claim 13, further comprising adjusting the one or more alarm settings by changing the scheduled alarm time to one of earlier and later than the scheduled alarm time based on the environment data.

15. The method of claim 10, further comprising resetting the one or more alarm settings to the original settings in response to the alarm being triggered.

16. A program product comprising a Non-transitory computer readable storage medium that stores code executable by a processor, the executable code comprising code to perform:
    determining one or more settings for an alarm;
    determining context data associated with the alarm, the context data affecting the one or more settings for the alarm, the context data comprising location data for a device associated with the alarm, the location data comprising information that may affect the one or more settings for the alarm; and
    adjusting the one or more settings for the alarm based on the context data prior to the alarm being triggered by disabling the alarm in response to the location data indicating that the device is at a location that is different than one or more of a location where the alarm was previously created and a location where the alarm was previously disabled.

* * * * *